(12) United States Patent
Pitzer

(10) Patent No.: US 10,033,459 B2
(45) Date of Patent: Jul. 24, 2018

(54) SYSTEM, METHOD AND APPARATUS FOR A ROGUE OPTICS NETWORK UNIT

(71) Applicant: Lantiq Deutschland GMBH, Neubiberg (DE)

(72) Inventor: Armin Pitzer, Krefeld (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1076 days.

(21) Appl. No.: 13/768,973

(22) Filed: Feb. 15, 2013

(65) Prior Publication Data

US 2014/0233940 A1    Aug. 21, 2014

(51) Int. Cl.
  *H04B 10/08*   (2006.01)
  *H04B 10/03*   (2013.01)
  *H04B 10/272*  (2013.01)
  *H04Q 11/00*   (2006.01)

(52) U.S. Cl.
  CPC ........... *H04B 10/03* (2013.01); *H04B 10/272* (2013.01); *H04Q 11/0067* (2013.01)

(58) Field of Classification Search
  None
  See application file for complete search history.

(56) References Cited

U.S. PATENT DOCUMENTS

| | | | | |
|---|---|---|---|---|
| 8,254,780 B2* | 8/2012 | Mizutani | ................ | H04B 10/03 398/17 |
| 8,582,969 B1* | 11/2013 | Sandstrom | ........... | H04B 10/503 398/17 |
| 8,781,322 B2* | 7/2014 | Lam | ..................... | H04J 14/0282 370/352 |
| 8,787,751 B2* | 7/2014 | Shaffer | ............... | H04B 10/0773 398/17 |
| 2005/0031352 A1* | 2/2005 | Light | .................. | H04B 10/0799 398/135 |
| 2007/0143645 A1* | 6/2007 | Haran | ................... | H04B 10/077 714/704 |
| 2008/0056731 A1* | 3/2008 | Weber | ................. | H04B 10/0793 398/197 |
| 2012/0033963 A1* | 2/2012 | Nose | .................... | H04L 12/2861 398/1 |
| 2012/0163808 A1* | 6/2012 | Kim | .................... | H04Q 11/0067 398/30 |

(Continued)

OTHER PUBLICATIONS http://en.wikipedia.org/wiki/Integrated_circuit.*

(Continued)

*Primary Examiner* — Ken N Vanderpuye
*Assistant Examiner* — Jai Lee
(74) *Attorney, Agent, or Firm* — Eschweiler & Potashnik, LLC

(57) ABSTRACT

A device is provided that mitigates the effects of an optical network unit (ONU) that is in a rogue state. A main processor is arranged as part of a monolithic semiconductor chip, the main processor configured to process signals from an optical telecommunication connection. A laser driver controls a laser coupled to the laser driver. Hardware logic is arranged as part of the monolithic semiconductor chip and arranged physically separate from the main processor. The hardware logic independently effects the laser driver to turn the laser off or reduce power output of the laser significantly to mitigate the effects of the ONU in the rogue state.

21 Claims, 7 Drawing Sheets

(56) References Cited

U.S. PATENT DOCUMENTS

2012/0301134 A1* 11/2012 Davari ............... H04L 41/5038
398/9

OTHER PUBLICATIONS

Wai-Kai, the Electrical Engineering Handbooki, 2005, Elsevier Academic Press, p. 324.*
Kal, Basic Electronics:Devices, Circuits, and IT Fundamentals, 2002, Prentice-Hall of India, pp. 337, 345.*
Vai, M. Michael, VLSI design, 2001, CRC Press LLC, p. 1.*

* cited by examiner

SYSTEM, METHOD AND APPARATUS FOR A ROGUE OPTICS NETWORK UNIT

BACKGROUND

In broadband networks in which a point-to-point connection is created between a central office (CO) and a subscriber or user, a crash typically only locally affects that particular subscriber. The problem can be better understood in the case of a Digital Subscriber Line (DSL) network 100 shown in FIG. 1a where a plurality of point-to point connections 102a . . . n are arranged to connect a central office (CO) 104 to a plurality of subscribers or users 106a . . . n using a twisted pair infrastructure. Of course, the DSL network may be arranged in a broadcast type arrangement. However, as shown in FIG. 1a there is a relative advantage to be observed in that a crash of the modem (not shown) corresponding to subscriber 106b is localized to that subscriber. In other words, should the modem of subscriber 106b malfunction or go offline unexpectedly or otherwise transmit spurious signals on the line, the only channel affected is the line or connection 102b. In addition, the subscriber may be able to resolve the situation without service support simply by manually resetting the DSL modem. The problem may also be resolved remotely by the network carrier or CO operator since the problem is localized to a specific and known connection.

While such point-to-point connections may be considered more robust in that they are more resistant to being effected by disturbances outside their connection, such systems typically are limited in bandwidth. Point-to-point communication networks also offer dedicated lines to different subscribers, thereby multiplying the number of lines required in such systems as compared with broadcast or shared connection arrangements. In addition, when the point-to-point modem malfunctions and is not resettable, typically service must be carried out for that particular unit or connection. Therefore, point-to-point connection may be considered to be resource intensive while providing a lower end of the bandwidth available from various network arrangements.

On the other hand, communication networks arranged in a broadcast arrangement or shared connection arrangement are capable of sharing resources such as communication connections or lines. Shared lines also allows for combining bandwidth on several lines, thereby allowing for increased bandwidth over point-to point arrangements. In a broadcast arrangement, typically a single CO broadcasts data or communication signals to a plurality of subscribers over a plurality of lines. In many instances the CO listens to the traffic collectively from several lines, which may be connected to a single point at the CO end. In such an arrangement, the communication system is greatly reduced in terms of resources. In addition, typically greater bandwidth is available or bandwidth balancing may be engaged to offer greater bandwidth in some instances.

BRIEF DESCRIPTION OF THE DRAWINGS

The various embodiments can be better understood with reference to the following drawings and descriptions. The components in the figures are not necessarily to scale, instead emphasis is placed upon illustrating the principles of the invention. Moreover, in the figures, like reference numerals designate corresponding parts. In the drawings.

DETAILED DESCRIPTION

Figure 1A:
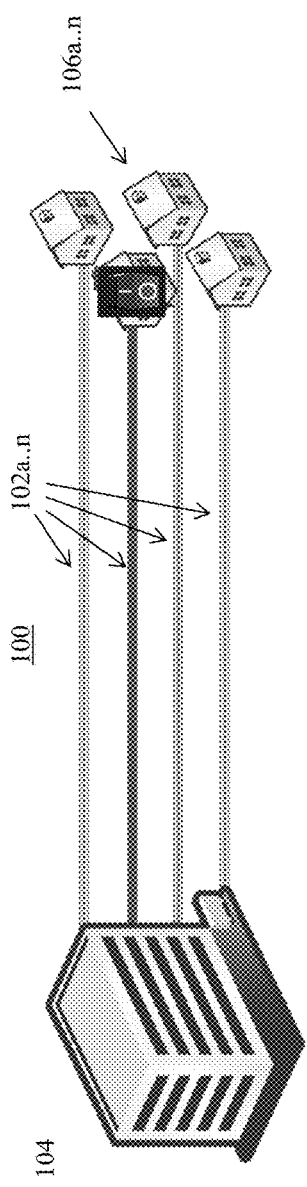
FIG. 1a illustrates an exemplary DSL network where a plurality of point-to point connections are arranged to connect a CO to a plurality of subscribers or users.
Figure 1B:
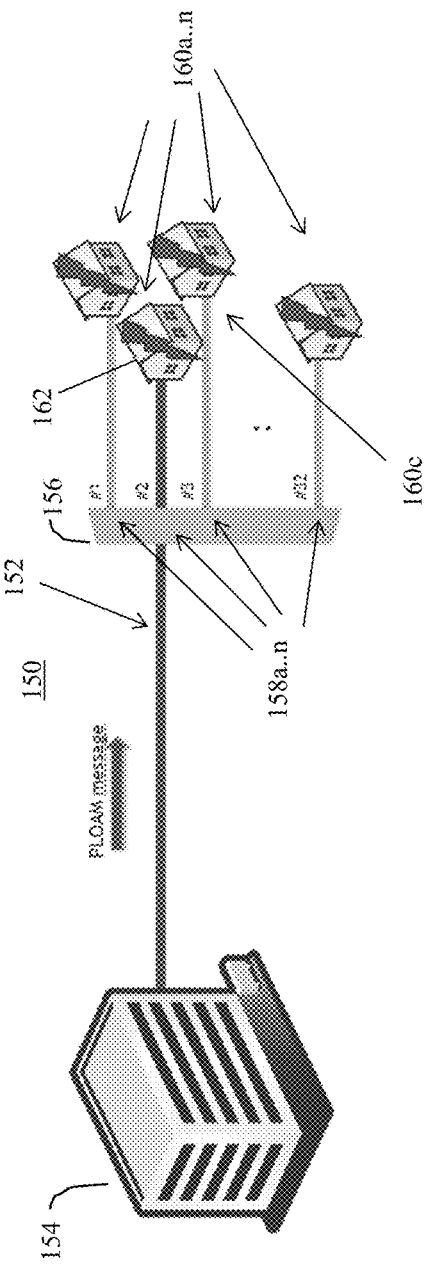
FIG. 1b illustrates an optical network where a CO connects through a switch or multiplexer to a number of connections, each of which are routed to a respective subscriber.

The paradigm situation is shown in FIG. 1b wherein an optical network 150 is arranged in a broadcast arrangement, or as shown here a point-to-multipoint arrangement. In more detail, a CO (or base station in mobile telephone terms) 152 connects through a single point 154 through a switch or multiplexer (MUX) 156, which is typically located in proprietary equipment in the locale of a group of subscribers (curbside equipment), to a number of connections 158a . . . n. The connections are then routed to a respective subscriber or user 160a . . . n.

In systems such as these, a more sophisticated arrangement for communicating between the CO 152 and subscriber modems is needed in order to route the data correctly between subscriber 160a . . . n and CO 152, and vice versa. In a typical arrangement, a beacon and signaling protocol is used such as promulgated by the GPON standard. Similarly, WLAN networks analogously employ a beacon and signaling protocol. In such communication networks or standards, the nodes of the network must comply with a very strict set of rules dictating when each node may speak.

For example, passive optical networks (PON) provide in downstream direction (network to user) a point to multipoint connection while in upstream a point to point connection is used. A time division multiplexing scheme is used for upstream transmission. Only one defined optical network unit (ONU) is allowed to transmit something at a pre-defined timeslot. If one ONU is working in an aberrant way the general upstream transmission system may be disturbed. This ONU behavior is called Rogue ONU.

The difficulties arise when one or more of the subscriber modems fails in some manner, either is inoperable or in a problematic case emits unwanted or spurious signals toward the CO 152. For the point-to-point system this raises less of a problem. The CO 152 can simply ignore spurious signals coming from a source that is known to be malfunctioning. In that case, the network operator can choose when to resolve the problem. In the point-to-multipoint (or multipoint-to-multipoint) situation, a terminal or node that speaks out of turn or emits spurious signals can cause disastrous problems for the network as a whole.

In terms of FIG. 1b, a malfunctioning subscriber unit or modem (rogue ONU, optics network) is illustrated by reference numeral 162. In the case of a rogue ONU, the signal sent may be out of turn or may be incoherent. The CO may, therefore, not be able to discern which end terminal or subscriber 160a . . . n is causing the problem. Should the user of the rogue ONU not recognize the problem or is simply not in the locale, the spurious signal can continue to disrupt and completely block off all other communications on the point-to-multipoint trunk. The spurious signal emission will interfere with valid transmission of other terminal units at subscriber 160 *a, c* and *n* (called victims), for example, as indicated in the figure by the lightning bolts superimposed on the respective residences or business offices.

The only way then is to handle the situation is to send an expensive service technician to the curbside equipment (service call) to locate and identify the offending node. Worse, if the user is not at home then the serviceman (who cannot access the malfunctioning unit in the home) may have to simply cut the line to the user. This creates further headaches for the affected user and added labor and costs for the network operator who must then repair the cut line. In other words, a spurious signal has the very real potential of corrupting signal data from another node, thereby effectively frustrating another communication line. Worse, so long as the rogue ONU is not halted or reset, the other connected ONUs cannot also function.

Such situations often do arise and create severe headaches for users who complain to their networks in turn. Such disruptions and outages have been known to cause networks to pay rebates to users and lose subscriptions. Network providers simply cannot afford to incur repeated disruptions. Through increased overhead costs of sending service repairmen to locations (service calls) or losing customers, the network simply must find a solution to this widespread problem.

In our PON example, a scheme is provided to detect and assist the CO in identifying the rogue ONU. In the scheme, one or more ONUs are loaded with a software that is operated by the main processor to detect an un-proper operation. In response, the software informs the CO, termed a PON master (Optical Line Terminal or OLT), about this operational state. The OLT, upon recognizing Rogue ONU behavior, tries to mitigate this issue by resetting the identified ONU remotely using one of the PON maintenance channels, a specialized channel reserved for standardized maintenance commands. A standardized command used to reset the rogue ONU is called a PLOAM message (physical layer operations and maintenance). These are standardized messages that include a standard message or message format. The ITU document 'Rogue ONU Considerations.pdf' Chapter 2.2 sets forth the methodology for PON networks in detail and is incorporated herein by reference.

The ONU processor detects these PLOAM messages through its normal transceiver and demodulation path. The message is then interpreted by the main processor (PON processor). If the standardized message or bit is received indicating that the PON processor should shut down the laser, then software that is operated by the PON processor causes the PON processor to set a register bit associated with the PON processor that corresponds to the enabling of the laser which is read by the laser driver. This in turn causes the ONU laser to shut down. A standardized reset message inside the PLOAM signal similarly is received by the normal transceiver path and interpreted by the main processor. In that case the main processor runs a software routine that resets the ONU accordingly.

The solution described above has proven in the industry to be a failure. Despite this tattle tale arrangement where other nodes "tell" on rogue ONUs, today's PON networks still suffer from and are plagued by rogue ONU problems. For one thing, it often occurs that the software operated by the main processor (PON processor) has failed in the field. Without proper working software, this scheme fails to be able to halt the signaling of the rogue ONU. More troubling is that actual network operators have experienced that it is most often the software itself to blame that causes a failure of the ONU CPU and cause that ONU to go rogue. In other words, the software need not fail, but simply work incorrectly to cause the ONU CPU to issue spurious signals.

The foregoing situation is not merely theoretical but happens in practice often. Today, many users have the option and often do customize their modems by downloading software or firmware to their units. It is typical in the OEM world for the box maker to download software or firmware from a vendor, who may not be authorized by the chip maker. Given the host of software available for download, it is not surprising that units fail to operate properly as often as they have. As a result of faulty operation owing directly from the software/firmware, ONU's have gone rogue. Problematically, spurious signals appearing on the same trunk line affects all users on the same multipoint line as explained. Therefore, the software based remote laser shutdown or unit reset capability is not a working solution that networks can rely on.

To reiterate, the network operator runs a Rogue ONU mitigation process whenever an ONU is going to be a Rogue ONU and this problem persists for a certain time. If that fails the network is forced to send a technician to the site of the 'rogue' ONU to fix the problem. Sending a technician to the customer is much too expensive. As noted, the GPON network may be negatively impacted. In the worst case the upstream transmission is stopped completely. That is not only big head ache for network operators it means money out of pocket and possible drops in subscriptions.

Part of the problem that has been observed is that the above-mentioned scheme operates on the main CPU directly. Another aspect of the problem may be quantified in that the scheme applies a software or firmware solution. Given the numerous sources of uploadable software/firmware, it is the methodology of using software/firmware itself, particularly downloadable code, that is problematic and contributes to the cause of rogue ONUs. It shall also be observed that, while the methodology, is standardized, the manner in which the software or firmware carries out this methodology is not standardized. As such, the software/firmware stands much more chance to be written incorrectly, thereby exacerbating the problems.

In another aspect, it shall be observed that such a point-to-multipoint system is vulnerable to intentional attacks. Supposing a hacker desired to disrupt a home or office, or even a governmental facility. The hacker would need only connect or find a connection on the same trunk and cause that ONU to act sporadically. This would not be difficult to accomplish without hardware modification by simply manipulating the software that is readily available, for example, through the Internet. One could also imagine other scenarios that might involve white criminal or criminal behavior.

The proposed solution resolves or mitigates the foregoing deficiencies by ensuring effective laser turn-off (or power reduction) or otherwise resetting the rogue ONU. In a specific solution, this may be accomplished by bypassing the problems caused by the software/firmware solution. In another aspect, the solution provided works with legacy systems that are enabled to employ the present rogue ONU methodology described above. The proposed solution further fixes the problems generated by software/firmware and effectively halts the laser or resets the unit caused by the software/firmware. The proposed solution in another aspect utilizes the standardized signaling already existing, such as the PLOAM packet or frame. The solution and its attendant features is not limited to PON systems but any similar situation that may occur in, for example, point-to-multipoint networks.

In another aspect, the solution uses available resources. For example, the solution may utilize the standard OAM channel to control the physical layer of the network. In another aspect, the solution generates a standard message (Physical Layer OAM message). The standard message may include a non-standard identifier. In one example, the message includes a standard ONU Identifier and a specific, non-standard message Identifier (ID) that is transmitted to the corresponding ONU. In another aspect, the ONU is modified to detect this non-standardized message and perform the associated consequent actions, namely halting the laser (or reducing power) or resetting the unit, or a combination of these contingencies. To differentiate between the consequent actions two messages with different message IDs may be pre-defined.

With the instant solution, the laser is immediately or effectively immediately shut down or reduced in power sufficiently not to emit interfering signals. In this manner, erroneous upstream transmission is stopped. In addition or in the alternative, the ONU is reset. Further, a re-boot of the ONU may be enforced. In this manner, the solution has the effect of keeping the impact of the malfunction of the rogue ONU as local as possible.

Figure 2:
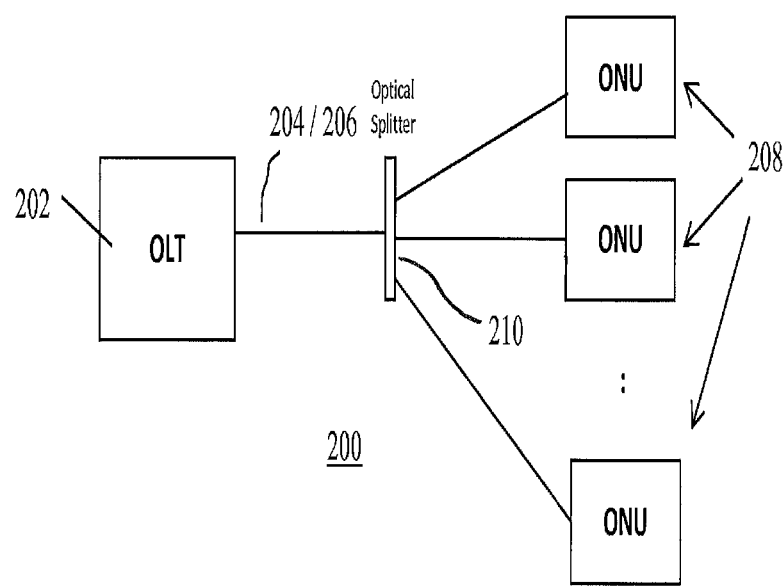
FIG. 2 illustrates an optical network including an optical line terminal (OLT) coupled to a plurality of optical network units (ONU).

Attention is now directed to FIG. 2 wherein the solution proposed shall be described in more detail. To reiterate, while the solution is described in terms of an optical network (ON) the invention is actually much more divers and applies to any network in which similar problems arise due to spurious signaling.

In FIG. 2 there is shown a representative network 200 according to the proposed solution, which in this example is a PON network. A PON master 202 is provided as the OLT and a communication line 204, which is exemplified as a single fiber 206, is coupled to or connects the OLT with all clients 208, herein exemplified by ONUs. A MUX or in this case a splitter 210, which is exemplified by an optical splitter, may be provided and enables the optical link distribution to all clients 208 (ONUs).

In a downstream direction the network may be considered as a point-to-multipoint system and in an upstream may be considered a point-to-point system. As already described, an ONU (for example, 210) may operate in an aberrant way (a rogue ONU). This may be for any reason, but may characteristically be due to a software/firmware failure. This rogue ONU 210 may very well stop client traffic to the OLT or even worse it may disturb the whole network connection in upstream as explained in detail.

Figure 3:
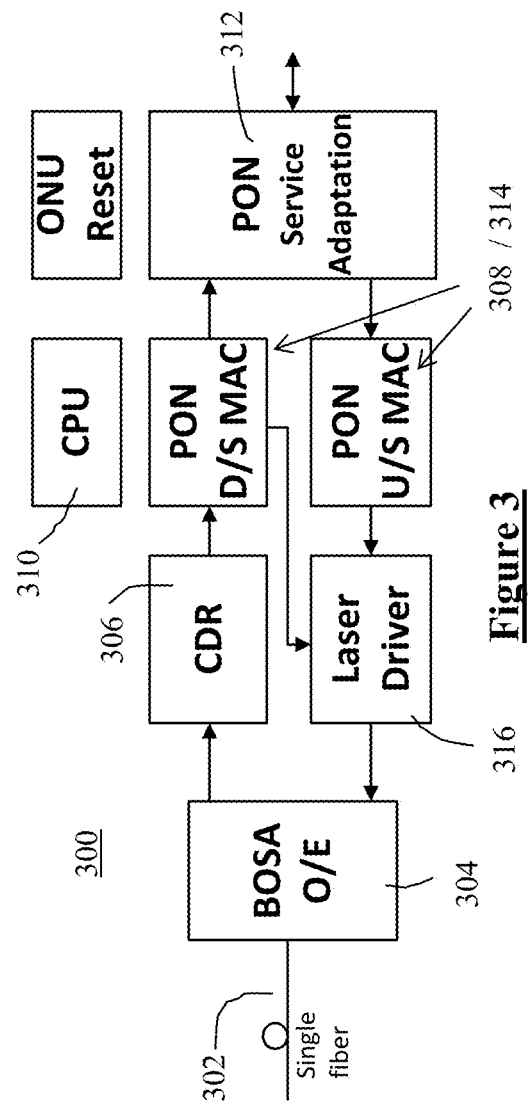
FIG. 3 illustrates an exemplary ONU and its functional blocks.

An exemplary client node 300 configured according to the proposed solution shall now be inspected in more detail with reference to FIG. 3. In this figure the exemplary client node 300 is discussed in terms of an ONU and its functional blocks. On the left side may be considered the input side 302 of the ONU, which here is exemplified by a single fiber link, although any link may accommodate the input. The input 302 indicated transfers traffic (PON traffic in this example) in the downstream direction to the ONU. Contrarywise, the ONU transmits traffic in upstream to the OLT.

Also included in a typical arrangement for a client are all the components use for telecommunication signaling, including an RF transceiver. This may be included, for example, in a transceiver portion 304 such as the shown opto-electric bidirectional optical subassembly (O/E BOSA). Other components necessary and typical for such telecommunication may also be included but not shown since one skilled in the art understands and readily knows how to include such components.

To continue with FIG. 3, a Clock and Data Recovery (CDR) 306 is provided that extracts the received datastream. A MAC (media access controller) 308 such as a downstream (D/S) PON MAC is provided that may perform frame processing that may include alignment and/or searching for the downstream frame start at the ONU. This may be provided with a synchronizer for this purpose. Each PON network may provide an OAM maintenance channel for the physical layer.

The client 300 of the proposed solution is arranged to provide identification of a signal that indicates that the client 300 needs to take care of spurious signals, that is, is malfunctioning in some manner. In terms of the PON network in our example, a GPON/XGPON1 network, for example, calls for a standardized Physical Layer OAM (PLOAM) channel which is a specific message having a fixed parameter field with standardized messages or ID signals or bits included therein. The PON and GPON standard are incorporated herein by reference. In regards to this example, the solution provided detects and filters the PLOAM message.

In an aspect thereof, the message signal is broadcast to a plurality of the nodes (FIG. 2). In that regard, there may further be provided a mechanism that allows the client 300 to recognize that the message (or PLOAM message) applies to that particular client 300. In a further aspect, the solution may provide that a non-standard signal is provided either alone or within the standard message (PLOAM message). The client 300 or the specific ONU may be configured to include the capability of extracting or identifying the signal. In this manner, the exemplary OAM messages may be extracted. This may be provided by a parser in one aspect of the solution.

In order to bypass the problems associated with software/firmware, the proposed solution in one aspect provides a solution that is separate and/or isolated from the main processor, or in this example the PON processor or CPU 310. In one arrangement, specific hardware is provided separate and distinct from the CPU 310 or core of the CPU and is exemplified in the figure as PON service adaptation 312. The hardware may incorporate transistor logic to identify the signal and/or further logic to act in response of detecting the signal. The hardware may further include in addition or in the alternative transistor logic or a coupling or connection to a driver of the laser. This may further include transistor logic to control the driver by either setting a register within the laser driver that controls the laser to be turned on or off or to reduce the power by a significant degree sufficient to make any signal non-interfering. The hardware may include the laser driver itself and include transistor logic to directly switch the laser optics.

It shall be appreciated that the instant solution is not desirable from the point of view that it adds additional hardware to the chip. This would require at least a partial redesign. It was also not possible before to provide such solution because it has not been until very recently that the MAC has been integrated on the PON chip. Therefore, it was not possible to directly control the laser driver. That is it was not possible to make a direct connection between the MAC or the unit that detects the message and the laser driver. In addition, the PON standard requires that a software method be employed that utilizes the PON CPU because the standard requires standard messages.

The solution here is particularly applicable to a single chip, that is a single die such that it comprises a single monolithic structure. Although, the solution equally applies to solutions using multiple die arrangements or multiple block packages on a PCB. The benefit of the single chip solution, also known as System on Chip (SoC), is that the single chip solution allows the direct control of the laser (or system reset), thereby allowing the CPU Software/Firmware solution to be bypassed if it is acting erroneously or is the cause of the spurious signals.

In other words, the added hardware logic to the single chip solution may be arranged as a stand-alone and separate circuit from the CPU. This is shown in the Figure that intentionally illustrates the CPU as uncoupled from the MAC and PON service adaptation 312. To reiterate, since the solution here is arranged independent of the CPU, it is not affected by any software/firmware failures of the resident software/firmware and can operate to head off a failure of the CPU. In fact, a failure of the CPU itself will also be resolved by the current solution. Independent in one sense means that the solution is not controlled by the CPU, such that the hardware is able to control the laser without CPU support. It may also mean that the CPU is not in the path between the input message, the MAC 308, PON service adaptation 312 and the laser driver.

In one variation, the hardware circuitry is coupled to the CPU, for example, so that the hardware circuitry can read the registers of the CPU and may also set them to indicate that the laser has been taken off line. Additionally or in the alternative thereto the hardware is configured to set the register of the CPU to cause a system reset. Since the hardware is on chip with the CPU, this becomes possible.

It shall also be appreciated that the hardware logic may be configured at the factory. This is typically done by the CPU. This may include configuring registers of the hardware logic with the name of the ONU in order that the hardware logic may identify when a broadcast message is referencing that ONU. This in no way effects the ability of the ONU of the present solution from mitigating the effects of the rogue ONU. During normal operation, that is, after factory configuration the hardware logic is typically not again configured. In addition, the CPU is not expected to malfunction in the factory. Once in normal operation, that is after factory configuration, the hardware logic is independent of the CPU.

In addition, the solution includes various mechanisms to detect that the message is directed to the particular client 300. In one arrangement, there is provided a parser that parses the signals or messages arriving at the client 300. The parser may be arranged in the MAC. In one aspect, the parser is designed to parse non-standard portions of a standardized message such as the PLOAM.

In the upstream direction the client traffic from the service adaptation function 312 is forwarded via an upstream PON MAC 314 to a laser driver 316 which finally controls the electrical to optical conversion. In the case where the laser is shut off or reduced in power, traffic arranged by the CPU for transmission will not be transmitted and interfere with the network.

In an additional aspect, the solution reduces the power of the laser substantially such that the laser output has no dilatory effect on the network. This may be coupled with a low power mode that conserves power. In another aspect, the hardware logic causes the laser to enter a low power mode after a pre-determined time, such as after a watchdog timer expires. Another trigger for the low power mode may be if the ONU self detects that it is in a rogue state and does not receive a message from the OLT. The low power modes are defined, for example, in the relevant PON standards as being of a certain SNR level and are not repeated here since the skilled person knows these levels.

Figure 4:
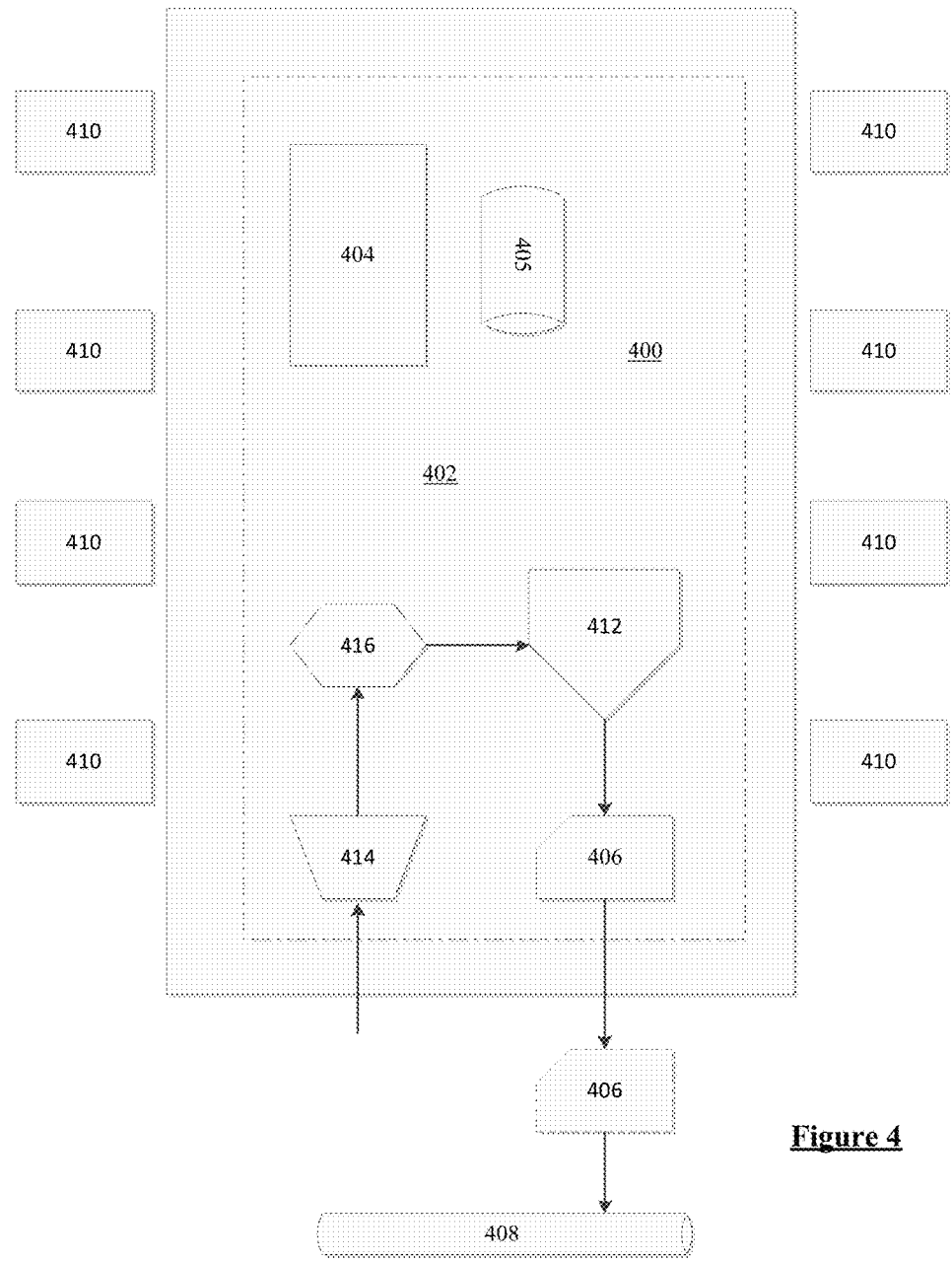
FIG. 4 illustrates the layout of an exemplary ONU.

FIG. 4 illustrates the layout of an ONU of the proffered solution. FIG. 4 shows a monolithic structure 400, that is, semiconductor die singulated from a wafer forming a continuous piece of silicon. The monolithic structure 400 of course may be a number of dies assembled on one lithography as is common in the semiconductor industry. The die 402 includes a CPU 404, a cache or memory 405 associated with the CPU. The laser driver circuitry 406 may or may not be located on the die. The laser 408 is typically off die, but this may change in the future. Pins 410 are also shown as part of a completed package. The hardware logic 412 is shown as separate logic from the CPU. The CPU 404 as well as the hardware logic 412 may include registers. The CDR 414 and MAC 416 are also shown.

Another important aspect of the solution is the use a non-standard OAM message ID within a standardized message to reset the ONU remotely without software interaction of the CPU. Therefore the impact on a rogue ONU is held as local as possible. As already discussed, it is typically the Software that drives the ONU to be rogue. All of these messages until now have been interpreted by the CPU using software. No one until now has embedded an OAM message programmed in hardware as the solution here does.

The solution may define one or more non-standard message types. In one aspect, the solution provides up to two non-standard message types to enable a remote reset of the ONU without software interaction. As an alternative, a single message-ID can be used and the different consecutive action taken by the ONU are indicated by received OAM message data field. An indicator is used to either shut down the laser driver or the total ONU. As already discussed, the indicator may be setting a register in the laser driver.

Figure 5:
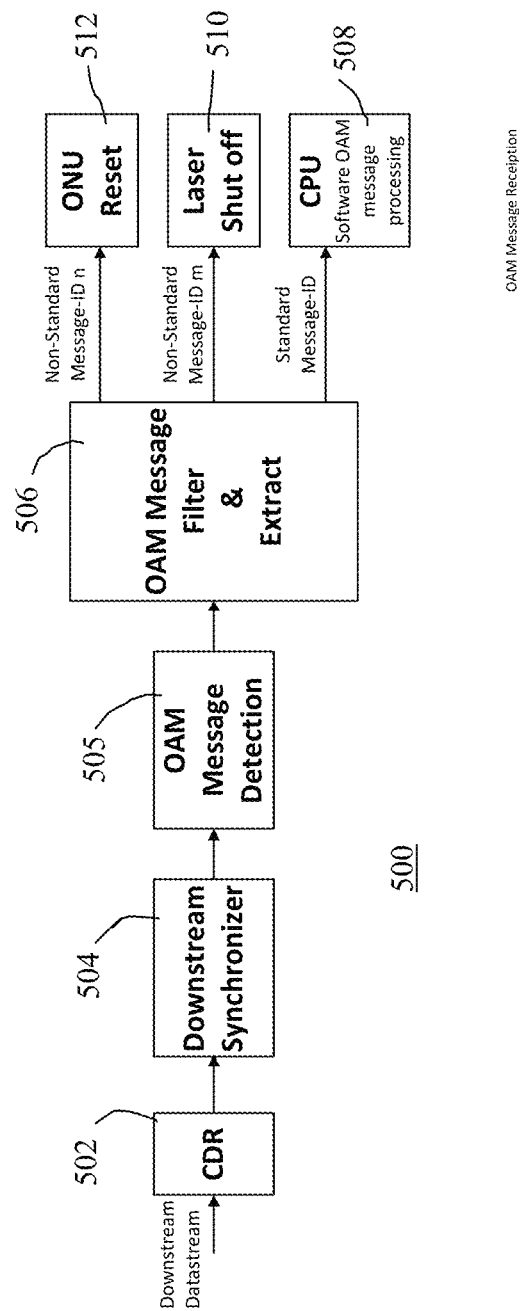
FIG. 5 illustrates the received processing of an operations and maintenance (OAM) message within an ONU's downstream media access controller (MAC).

The FIG. 5 illustrates the received OAM message processing within the PON downstream MAC 500. On an input side, the input signal is coupled to the CDR 502. The received and filtered OAM messages are only accepted if they belong to the specific ONU. The ITU/IEEE standards define the maintenance channel with all message types and formats being used. The messages are parsed which may be achieved with the synchronizer 504. The synchronizer detects a standard defined framing pattern within the downstream datastream. The pattern must be correctly detected for 'n'-consecutive occurrence equally spaced within the datastream. After 'n' times successfully detecting the well-defined pattern synchronization is achieved. Synchronization is lost after not detecting the framing pattern for 'm' times. 'n' and 'm' are typically configurable. The parsed message is then detected by, for example, comparison to a register with the name of the ONT unit as indicated generally by 505. Typically the OAM messages are filtered and extracted, for example, by the OAM message filter 506 and forwarded to the CPU 508 which performs all consequent actions.

Each message type may be identified by a so called message identifier or message-ID as already discussed. The solution may employ the standard defined OAM message format with a configurable non-standard message-ID in order to distinguish the consecutive actions which should be done. As shown in the figure, the non-standard messages are used to signal the laser 510 to shut down or off. For example, two non-standard message-IDs are implemented to let the OLT (network operator) decide which action may be appropriate to solve the rogue ONU issue. One non-standard OAM message may, for example, stop the upstream transmission immediately. Again, this avoids software interaction from the CPU. This is achieved by shutting down the laser driver. The second OAM message may, for example, reset the total ONU and enforce a reboot of the ONU system as indicated in general by reference numeral 512. The PLOAM Message ID may be used to enforce different consecutive actions like laser shut down or ONU reset.

Figure 6:
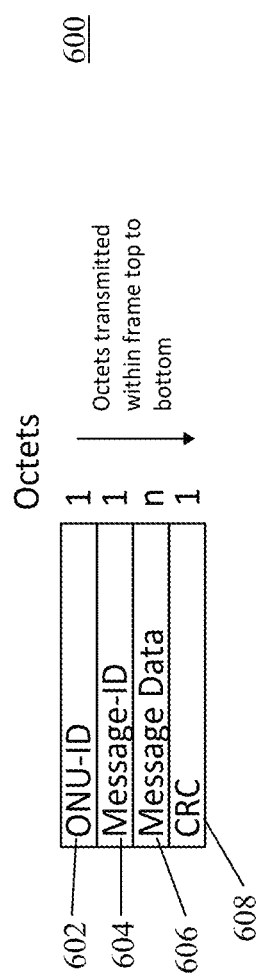
FIG. 6 illustrates a possible message configuration.

FIG. 6 describes a possible message configuration 600, such as a GPON OAM message format which may be used with the instant solution for management of the GPON network physical layer. EPON and XGPON1 may have slightly different formats. They are also applicable to the instant solution.

In the figure the ONU-ID 602 is an identifier for the addresses ONU. This ONU-ID is assigned by the OLT during the ONU bring up process. The Message-ID 604 indicates the message type. There are standard defined message types defined which manages the upstream and downstream ONU behavior. Not all 256 message type combinations are used by the standard. The Message Data field 606 is used to transport the payload of the message. A standard defined number of bytes is used. A CRC field 608 may also be applied for error correction purposes according to known correction methods. This field is a frame check sequence and is used by the ONU to drop the message in case the CRC is incorrect.

Figure 7:
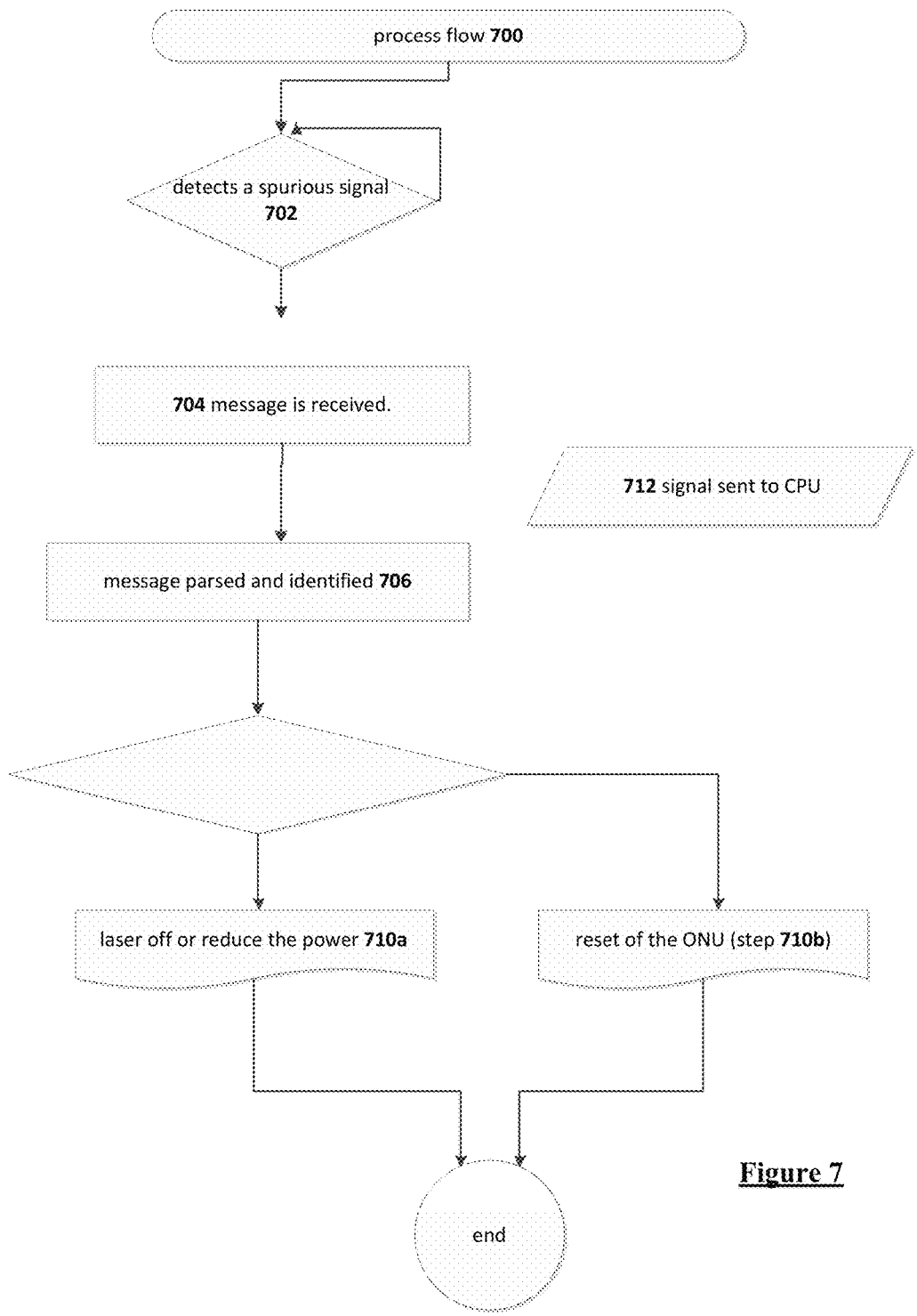
FIG. 7 illustrates a process flow of a method in accordance with one aspect of the present invention.

Now with respect to FIG. 7, a process flow 700 of the solution provided will be discussed. The OLT detects a spurious signal on the line in step 702 and generates a message to broadcast. In a step 704, a message is received. Then the message is parsed and identified if it applies to the particular ONU in step 706. A hardware unit then decides which action to take in step 708, for example, to turn the laser off or reduce the power (step 710a). In another aspect, the hardware unit may alternatively or in addition cause a reset of the ONU (step 710b). In an additional step 712, a signal is sent to the PON CPU, such as a signal to set the register indicating a Laser disable is effected or to trigger the power reset.

In one aspect, the OLT detects bit errors in the upstream datastream. If they consists for a certain time the OLT may have different solutions to mitigate the problem. One solution is the ONU scanning method where each ONU is individually enabled and forced to transmit in the assigned timeslot while all of the ONUs are quiet. In this way the OLT checks the feedback from each ONU one after the other.

Various systems, methods and apparatuses have been described. It shall be appreciated that the various features and steps may be performed in combination or individually and shall not be understood solely to the arrangement or order in which they are here described.

The invention claimed is:

1. An apparatus for mitigating effects of an optical network unit (ONU) that is in a rogue state, the apparatus comprising:
a main processor arranged as part of a monolithic semiconductor chip, the main processor configured to process signals from an optical telecommunication connection;
a laser driver that controls a laser coupled to the laser driver; and
hardware logic arranged as part of the monolithic semiconductor chip and arranged physically separate from the main processor,
wherein the hardware logic independently, affects the laser driver to turn the laser off or reduce power output of the laser significantly to mitigate the effects of the ONU in the rogue state.

2. The apparatus of claim 1, further comprising a standardized message with a non-standardized message identification (ID) that identifies the ONU is in the rogue state.

3. The apparatus of claim 2, wherein the standardized message is a PLOANI or ECF (Ethernet control frame) signal.

4. The apparatus of claim 2, further comprising an optical line terminal (OLT) that generates the standardized message.

5. The apparatus according to claim 1, wherein the ONU is in a point-to-multipoint communication network.

6. The apparatus according to claim 1, wherein the laser driver is on board the monolithic semiconductor chip.

7. The apparatus of claim 1, wherein the ONU operates within a PON standard protocol.

8. The apparatus of claim 1, wherein the hardware logic turns off the laser by directly accessing the laser driver.

9. The apparatus of claim 6, wherein the hardware logic turns off the laser by setting a register in the laser driver indicating that the laser driver should disable the laser.

10. The apparatus of claim 1, wherein the hardware logic performs at least one of turning off the laser by resetting the ONU or causing the laser driver to reduce power output of the laser to a low power mode.

11. The apparatus of claim 8, wherein the hardware logic initiates a signal that sets a register in main processor indicating that the main processor should reset the ONU.

12. The apparatus of claim 9, wherein the hardware logic is coupled to the main processor.

13. The apparatus of claim 1, wherein hardware logic is not controlled by the main processor.

14. The apparatus of claim 1, wherein the hardware logic causing the laser driver to reduce power output of the laser to a low power mode comprises a transistor logic to identify a message signal and further logic to act in response to detecting the signal.

15. The apparatus of claim 1, further comprising software or firmware executed by the main processor that initiates a message indicating the ONU is in the rogue state.

16. The apparatus of claim 15, wherein the hardware logic operates independently of the software or firmware.

17. The apparatus of claim 15, further comprising sending a standardized message with a non-standard message identification (ID) indicating that the ONU has entered the rogue state.

18. The apparatus of claim 15, further comprising turning off the laser through resetting the ONU.

19. The apparatus of claim 15, further comprising turning off the laser by directly controlling the laser driver.

20. The apparatus of claim 15, further comprising reducing power of the laser driver to a low power mode.

21. The apparatus of claim 15, further comprising applying a hardware solution to implement the hardware logic independent of the main processor.

* * * * *